April 22, 1952   A. RHODES   2,593,609
HANDLE CONNECTION
Filed Feb. 1, 1946

INVENTOR.
ALBERT RHODES
BY
Oberlin & Limbach
ATTORNEYS.

Patented Apr. 22, 1952

2,593,609

UNITED STATES PATENT OFFICE 2,593,609

HANDLE CONNECTION

Albert Rhodes, Cleveland, Ohio

Application February 1, 1946, Serial No. 644,964

3 Claims. (Cl. 287—53)

This invention relates to improvements in a non-rotatable connection between the stem portion of a valve unit and the handle to be connected thereto. In domestic water faucets for example, the seat and threads in the faucet body eventually become worn or damaged beyond repair and in order to avoid the expense of an entirely new faucet, a replacement valve unit such as, for example, that disclosed in my Patent No. 2,549,010, dated April 17, 1951, may be assembled in the old faucet body to provide a new seat and new threads for engagement with the new valve stem. The valve stem handles manufactured have many different sizes and shapes of apertures so that it is usually necessary to purchase a new handle as well as to fit the new valve stem.

The object of this invention is to provide a unit in which there are means for rendering the stem universal so that handles of different sizes of apertures therethrough can be secured to the stem.

Other objects and advantages will become apparent as the following description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
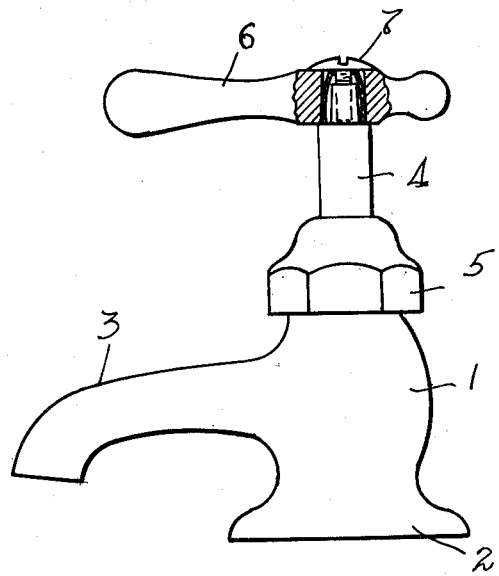
Fig. 1 is an elevational view of a faucet of conventional type with a portion of the handle shown in cross-section.

As shown in Fig. 1, the faucet with which these units are used comprises a body 1 having an inlet port formed in the base 2 thereof and a spout 3 for the discharge of water therefrom. Mounted within the body 1 will be a valve unit (not shown), which may be of any conventional construction and forms no part of the present invention. The usual stem 4 for operating the valve unit projects above the faucet body and is encircled by the usual bonnet 5 secured as by means of a threaded connection to the faucet body.

Figure 2:
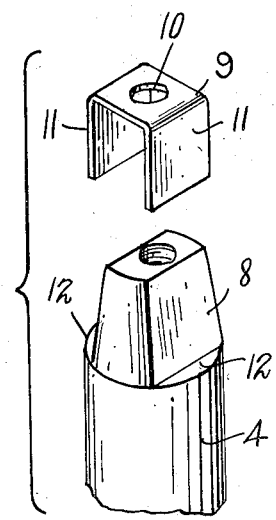
Fig. 2 is a perspective view of a handle spacer member and the end portion of the stem.

As shown in Figs. 1 and 2, there is an operating handle 6 secured to the end of stem 4 as by a screw 7, the head of which bears on the handle and the threaded portion of which engages in threads in the end of the stem. The end portion of stem 4 is provided with a portion 8 of non-circular cross-section and the handle is provided with an aperture of complementary cross-section. When the stem end is inserted into a handle aperture, the complementary sections prevent rotation of the handle relative to the stem.

In actual practice, the handles produced by various manufacturers may have different shapes and sizes of apertures therethrough. For example, the handles may be provided with different sizes of square, hexagon, octagon, spline type or other types of apertures. To accommodate different sizes and shapes of handle apertures, I have provided a spacer member 9 between the stem end and the walls of the handle aperture which is capable of being bulged either inwardly or outwardly to non-rotatably secure the handle to the stem. This spacer member 9 is preferably U-shaped and has a hole 10 therethrough, through which screw 7 passes. The thickness of spacer member 9 is selected so that the depending legs 11 thereof can be buckled or bulged by endwise force thereagainst. With large size handle apertures the depending legs 11 should be of length exceeding that of the stem portion from shoulder 12 to the end thereof and also that of the handle aperture. With the structure of Fig. 2, if the handle aperture should loosely fit over the spacer member 9, tightening of the screw 7 would cause the head thereof to bear against spacer member 9 and because the legs 11 thereof will be in contact with shoulder 12, the legs 11 will be caused to buckle or bulge thereby effecting firm engagement thereof with the walls of the handle aperture to prevent relative rotation of the handle and stem.

Figure 3:
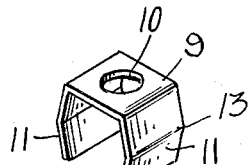
Figs. 3–6 are perspective views of several modified forms of handle spacer members.
Figure 5:
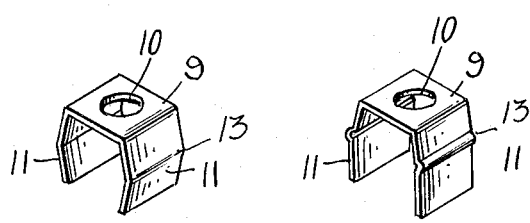
Figure 4:
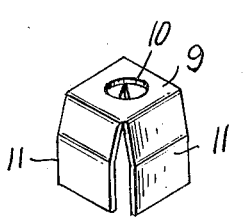

In the forms of spacer members shown in Figs. 3, 4 and 5, the depending legs 11 are bowed or deformed outwardly as at 13 so that a single spacer member can accommodate a wide range of sizes of handle apertures. In these forms, the inner surfaces of the depending legs 11 may engage the flat surfaces 8 of the stem and the outer surfaces 13 thereof may yieldably but firmly engage the walls of the handle aperture. In other words, the bowed portions 13 will be squeezed inwardly by handles having small apertures and will be buckled or bulged outwardly by screw pressure into firm engagement with handles having large apertures.

Figure 6:
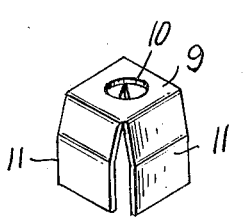

In the form of Fig. 6, the spacer member 9 is provided with four depending legs 11 and while two and four depending legs are shown in the various forms it will be obvious that any desired number of legs can be provided. Even with the forms showing two depending legs 11 it is possible to bulge the legs inwardly or outwardly (Figs. 3, 4, 5 and 6) and outwardly (Fig. 2) to accommodate handles having square, hexagon, octagon, spline and other types of apertures. The essential requirement is that the upper portion of the spacer member initially fit within the handle aperture. From that point on it is merely a question of bulging the legs 11 outwardly as in Figs. 2 to 6 or of squeezing the legs 11 inwardly as in Figs. 3 to 6.

Other modes of applying the principle of the invention may be employed, change being made as regards the details described, provided the features stated in any of the following claims or the equivalent of such be employed.

I therefore particularly point out and distinctly claim as my invention:

1. In a valve, the combination of a handle formed with a non-circular aperture therethrough, a stem formed with a reduced end portion of non-circular cross section forming shoulders at the adjacent portion of said stem, such stem end portion being disposed within and spaced from such handle aperture, a spacer between such handle aperture and stem end portion and provided with leg portions bearing on such shoulders and non-rotatably engaging such stem portion, such leg portions being of greater length than the distance from such shoulders to the end of said stem, and means bearing on the outer ends of such legs operative to buckle the same whereby the intermediate portions of such legs non-rotatably engage such handle aperture.

2. In a valve, the combination of a handle formed with a non-circular aperture therethrough, a stem formed with a non-circular end disposed within and spaced from such handle aperture, a U-shaped spacer over such stem end and including depending legs between such stem end and handle aperture and a leg-connecting portion disposed adjacent such stem end, means positioning said spacer with such leg-connecting portion axially spaced from such stem end, and means bearing on said spacer for moving the same to reduce such axial space, said first means being operative in response to such movement of said spacer to effect deformation of such depending legs into non-rotatable engagement with such stem end and handle aperture.

3. In a valve, the combination of a handle formed with a non-circular aperture therethrough, a stem formed with a non-circular end disposed within and spaced from such handle aperture, a spacer including depending legs between such stem and the walls of said handle aperture, means positioning said spacer with the outer ends of such legs axially spaced beyond such stem end, and means bearing on such outer ends of such legs operative to move said spacer to reduce such axial space, said first means being operative in response to such movement of said spacer to effect deformation of such depending legs into non-rotatable engagement with such stem end and the walls of said handle aperture.

ALBERT RHODES.

REFERENCES CITED

The following references are of record in the file of this patent:

UNITED STATES PATENTS

| Number | Name | Date |
| --- | --- | --- |
| 255,858 | Hidden | Apr. 4, 1882 |
| 859,200 | Clark | July 9, 1907 |
| 1,169,408 | Larson | Jan. 25, 1916 |
| 1,217,132 | Amos | Feb. 27, 1917 |
| 1,909,494 | Leins | May 16, 1933 |
| 2,043,418 | Newmark | June 9, 1936 |
| 2,186,499 | Riva | Nov. 21, 1938 |
| 2,208,929 | Jaegel | July 23, 1940 |
| 2,271,266 | Kost | Jan. 27, 1942 |